Nov. 5, 1963 W. R. HOWARD 3,109,524
POWER TRANSMISSION MECHANISM
Filed Dec. 8, 1958 4 Sheets-Sheet 2

INVENTOR.
WAYNE R. HOWARD
BY Kenneth C. Witt
ATTY.

INVENTOR.
WAYNE R. HOWARD
BY
Kenneth C. Witt
ATTY.

Nov. 5, 1963 W. R. HOWARD 3,109,524
POWER TRANSMISSION MECHANISM
Filed Dec. 8, 1958 4 Sheets-Sheet 4
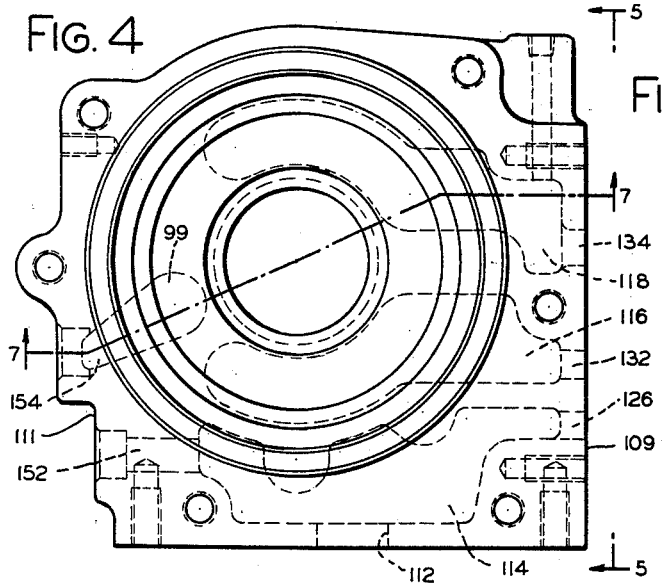
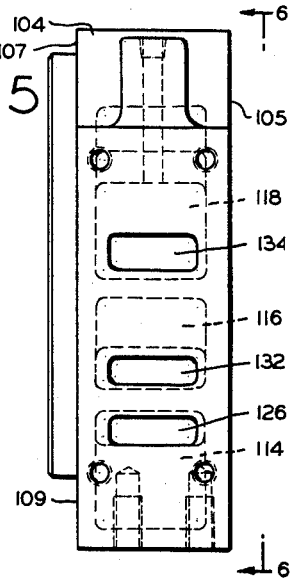
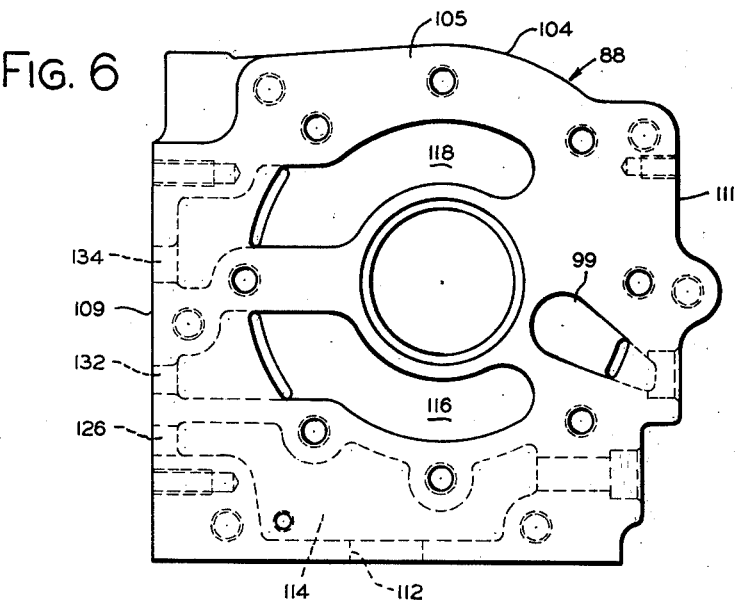
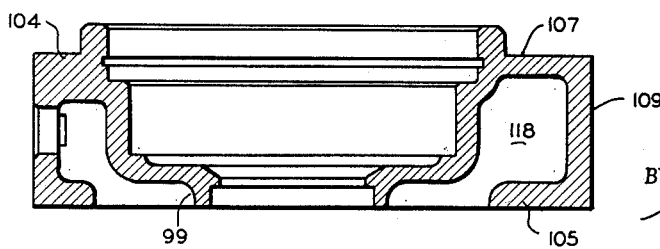
INVENTOR.
WAYNE R. HOWARD
BY
Kenneth C. Witt
ATTY.

United States Patent Office 3,109,524
Patented Nov. 5, 1963

3,109,524
POWER TRANSMISSION MECHANISM
Wayne R. Howard, Jackson, Mich., assignor to Clark Equipment Company, a corporation of Michigan
Filed Dec. 8, 1958, Ser. No. 778,763
11 Claims. (Cl. 192—3.2)

This invention relates to power transmission mechanisms which utilize fluid under pressure in the operation thereof, and more particularly to fluid circuits for such mechanisms.

The invention as disclosed herein is embodied with a power transmission having a fluid torque converter and a fluid pressure operated multiple disc clutch, but it will be readily appreciated that the invention is not limited to this particular embodiment.

In power transmission mechanisms which employ fluid under pressure it is necessary to have passages and conduits to conduct pressurized fluid from the pump or other source of fluid to and between the various portions of the power transmission mechanism and back to a reservoir or sump.

Many power transmission mechanisms of this type include a housing for many of the parts, and it has been common practice in the past to provide a considerable number of passages through the housing wall together with pipes, tubing and the like both inside and outside the housing to provide the complete fluid circuit for the power transmission mechanism. It is recognized, however, that such conventional construction is costly because of the considerable amount of material required and the labor required for assembly. A relatively large amount of material is required with such construction not only because of the pipes, tubes, fittings and the like which are required but also because of additional materials necessary to seal the various connections to prevent loss of fluid due to leakage. It is apparent also that a relatively large amount of labor is required with such a structure because of the quantity and variety of individual parts which must be assembled. A further disadvantage of such prior art structures lies in the difficulty of servicing them. More servicing is needed because of the quantity of joints and parts which are subject to leakage and breakage, and in addition service is relatively difficult and time consuming because of the complicated nature of the construction.

The present invention is directed to a construction for a power transmission mechanism which includes in a unitary sub-structure a fluid distributor block which contains many of the fluid passages required for the complete fluid circuit of the mechanism. The distributing block is located entirely within the housing of the mechanism and is provided with a plurality of flat sealing surfaces which eliminate many of the sealing problems and costly construction incidental thereto. The arrangement is such that a ready means of servicing the various portions of the transmission mechanism may be provided by means of adequate hand holes and covers which have flat sealing surfaces and do not, therefore, present difficult or expensive sealing problems.

With the foregoing in mind, it is an object of the present invention to provide a construction for a power transmission mechanism employing pressurized fluid, having a simple, compact and inexpensive fluid circuit arrangement.

A further object of the invention is to provide a fluid distributor block in a unitary sub-structure adapted to be mounted internally of the housing and to include many of the fluid passages for the mechanism.

A still further object of the present invention is to provide a construction for the fluid circuit of a power transmission mechanism which is readily accessible for servicing and maintenance when necessary.

A more specific object is to provide an improved and simplified fluid circuit arrangement for a power transmission mechanism which includes a fluid torque converter and a fluid actuated clutch.

The above and other objects and advantages of the present invention will become apparent to one skilled in the art from a study of the following description when taken in connection with the accompanying drawing which illustrates a preferred embodiment of the invention.

In the drawing:

FIGURE 4 is a view similar to FIGURE 3 illustrating the distributor block without the pressure regulating valves;

FIGURE 5 is a side elevational view of the distributor block as viewed along the line 5—5 of FIGURE 4 and showing the arrangement of fluid passages to which the pressure regulating valves are connected;

FIGURE 6 is an elevational view of the distributor block as viewed along the line 6—6 of FIGURE 5 and showing the arrangement of fluid passages for conducting fluid into and out of the torque converter;

FIGURE 7 is a cross-sectional view through the distributor block taken along the irregular line 7—7 of FIGURE 4 and showing in more detail the arrangement of certain of the fluid conducting passages therein.

Figure 1:
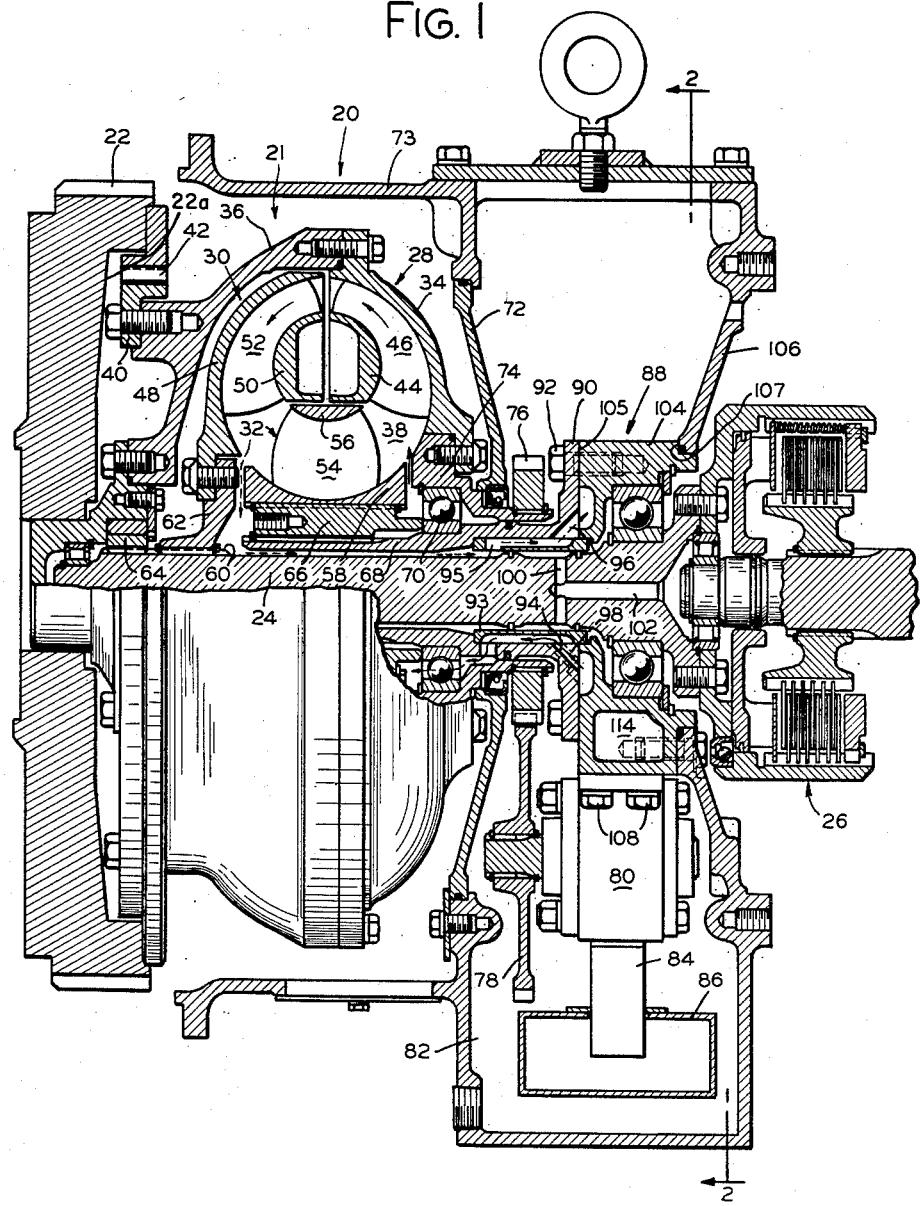
FIGURE 1 is a vertical cross-sectional view through a power transmission mechanism including a hydrodynamic torque converter unit and showing the general construction and arrangement of a fluid distributor block arranged according to the present invention in assembled relationship with such torque converter unit, the view being taken substantially along the line 1—1 of FIGURE 2.

In the embodiment of the invention chosen for illustration, the power transmission mechanism is indicated generally by the numeral 20. The mechanism 20 includes a hydrodynamic torque converter indicated by the reference numeral 21, and is adapted for connection to a flywheel 22 which may be connected to an engine (not shown). The torque convetrer 21 modifies the torque of the engine as it is impressed upon an output or driven shaft 24. The driven shaft 24 may be connected to any desired operating mechanism such as the change speed transmission of a vehicle. As illustrated, the shaft 24 is arranged to be selectively connected to the operating mechanism by a multiple plate clutch 26 shown diagrammatically in FIGURE 1 which is adapted to be selectively engaged by the application of fluid under pressure.

The hydrodynamic torque converter 21 illustrated and described herein is of conventional three wheel type and includes an impeller wheel 28, a turbine wheel 30 and a reaction member or stator 32. The impeller wheel 28 may be formed of an annular and generally dish shaped portion 34 connected in axial alignment to a member 36 to form a toroidal converter chamber 38. The member 36 is also dish shaped, having a peripheral portion which follows the outer contour of the turbine 30 and is connected to the flywhel 22 for rotation therewith by means of an externally toothed annular ring 40 which is mounted on member 36 and is in mesh with an internally toothed ring 42 carried by flywheel 22. The impeller comprises shell portion 34 of generally semi-toroidal shape, inner annular ring portion 44 and vanes or blades 46 extending between and connected to the shell and inner ring. The turbine 30 also comprises a semi-toroidal shell 48 and inner ring 50 having vanes 52 extending between and secured to the shell and inner ring. The stator 32 comprises vanes 54 extending between annular portion 53 and annular portion 56.

It will be understood that the outer and inner shell and ring portions of each vaned element or wheel are annular or complete rings, although only portions of the shells and rings are illustrated in the drawings, while the vanes may be curved and of varying thickness as is well-known in the art. The three vaned elements form and function as a hydrodynamic torque converter 21 with the vanes of the impeller 28 functioning to impart energy to a body of fluid in the chamber 38, the turbine 30 receiving energy from the fluid and stator 32 functioning as a reaction element to change the direction of the flow of fluid so that the device functions to multiply torque.

The driven shaft 24 is provided at one end thereof with elongated external splines 60 to which the turbine wheel 30 is attached by means of a cooperating internally splined member 62. Impeller connection member 36 is supported in an opening 22a in the flywheel and is provided in this particular mechanism with a one-way clutch connection at 64 to the driven shaft to prevent driven shaft 24 from overrunning flywheel 22. The stator 32 is connected by means of an internally and externally splined sleeve 66 to a stationary reactor sleeve 68. The portion 34 of the impeller wheel 28 is rotatably journaled by means of a bearing 70 upon the reactor sleeve 68 at a point adjacent a stationary dividing wall 72 in the housing 73 of the power transmission mechanism.

The portion 34 of the impeller wheel 28 carries a sleeve 74 which extends through the dividing wall 72 coaxially with the reactor sleeve 68 and carries at its free end a gear 76 which meshes with a gear 78 which in turn drives a pump 80. The pump 80 draws fluid from a sump chamber 82 formed in the housing by means of an inlet tube 84. A suitable filter 86 may be secured to the inlet tube 84 to trap foreign particles as the fluid is circulated and recirculated by the pump in a manner to be described presently.

As previously mentioned, the power transmission mechanism 20 includes an hydraulically operated multiple disc clutch 26 for selective connection of the torque converter to, for example, a transmission or gear box to be driven thereby. Fluid operated clutches of this type normally require the utilization of relatively high pressure fluid, for example, of the order of 150–200 pounds per square inch, for the satisfactory operation thereof, whereas, the torque converter 21 may operate satisfactorily with an internal fluid pressure of the order of 30–40 pounds per square inch. It is desirable, therefore, to provide a fluid distributing system or circuit having conduits and passages to direct and control the pressurized fluid from the pump 80 at a relatively high pressure for actuation of the clutch 26 and at a relatively low pressure for operation of the torque converter 20.

In accordance with the present invention a novel fluid distributor block, generally indicated at 88, is provided to accomplish the distribution of fluid to the clutch 26 and to the converter 20.

As may be seen in FIGURE 1, the stationary reactor sleeve 68 for the torque converter 21 is provided at its right hand end with an enlarged annular ring or flange portion 90 which serves as a mounting surface for one face of the distributor block 88 to which it is secured by means of machine screws 92 or the like. The reactor sleeve 68 is provided with a plurality of separate passages therein for the inlet and outlet of fluid to thereby establish a circulating path for fluid utilized in the torque converter 20. The passages in the reactor sleeve 68 are separated radially and circumferentially by means of a suitably formed internal sleeve 93 to form a pair of inlet passages 94 and a pair of outlet passages 96 (see FIGURE 3). The fluid thus may be directed under low pressure by means of the distributor block, in a manner to be presently described, to enter the converter through the reactor sleeve 68 and circulate therethrough in a path designated by the solid line arrows in FIGURE 1. The converter 20 discharges between the turbine wheel 30 and the stator 32 to the interior of the reactor sleeve 68 and thence openings 95 in sleeve 93 and through the outlet passages 96 as indicated by the path of the dotted line arrows in FIGURE 1.

Figure 2:
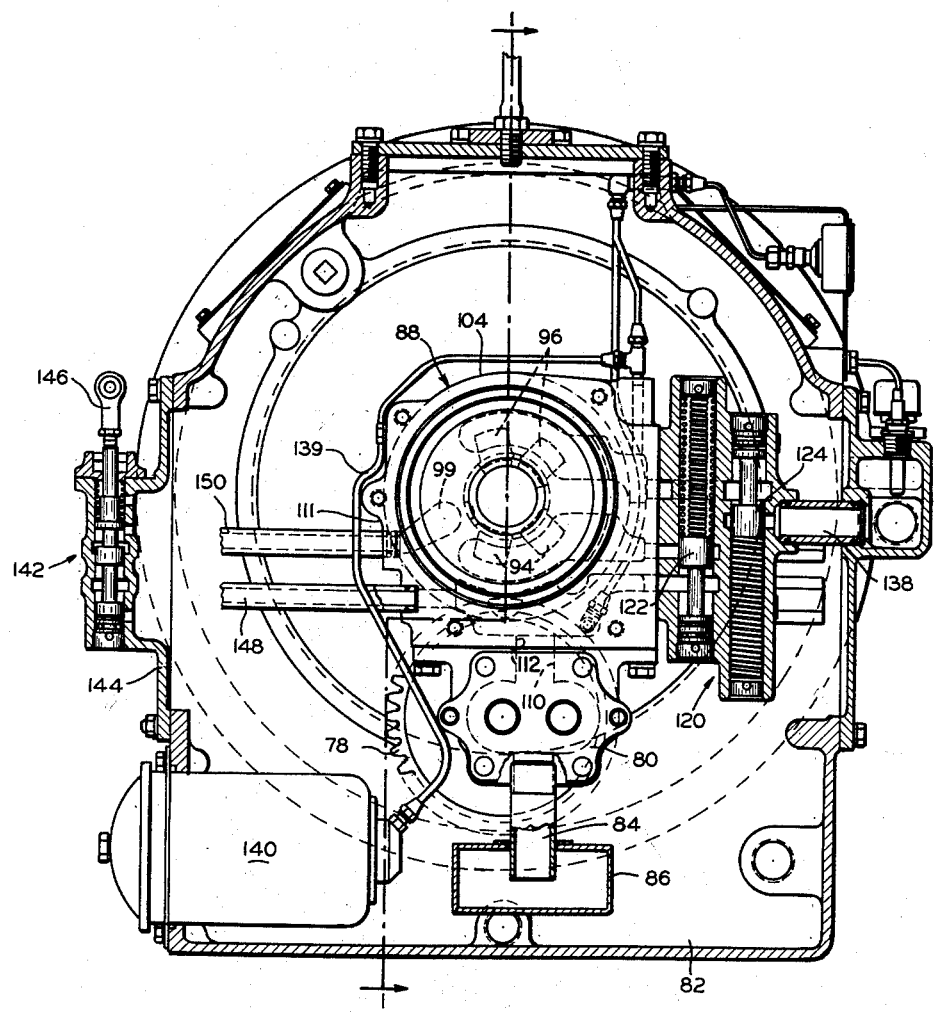
FIGURE 2 is a cross-sectional view on a slightly reduced scale of the mechanism taken substantially along the line 2—2 of FIGURE 1, with some parts of the mechanism broken away, showing in more detail the general arrangement of the fluid distributor block together with the connection thereto of certain control elements and regulating valves.
Figure 3:
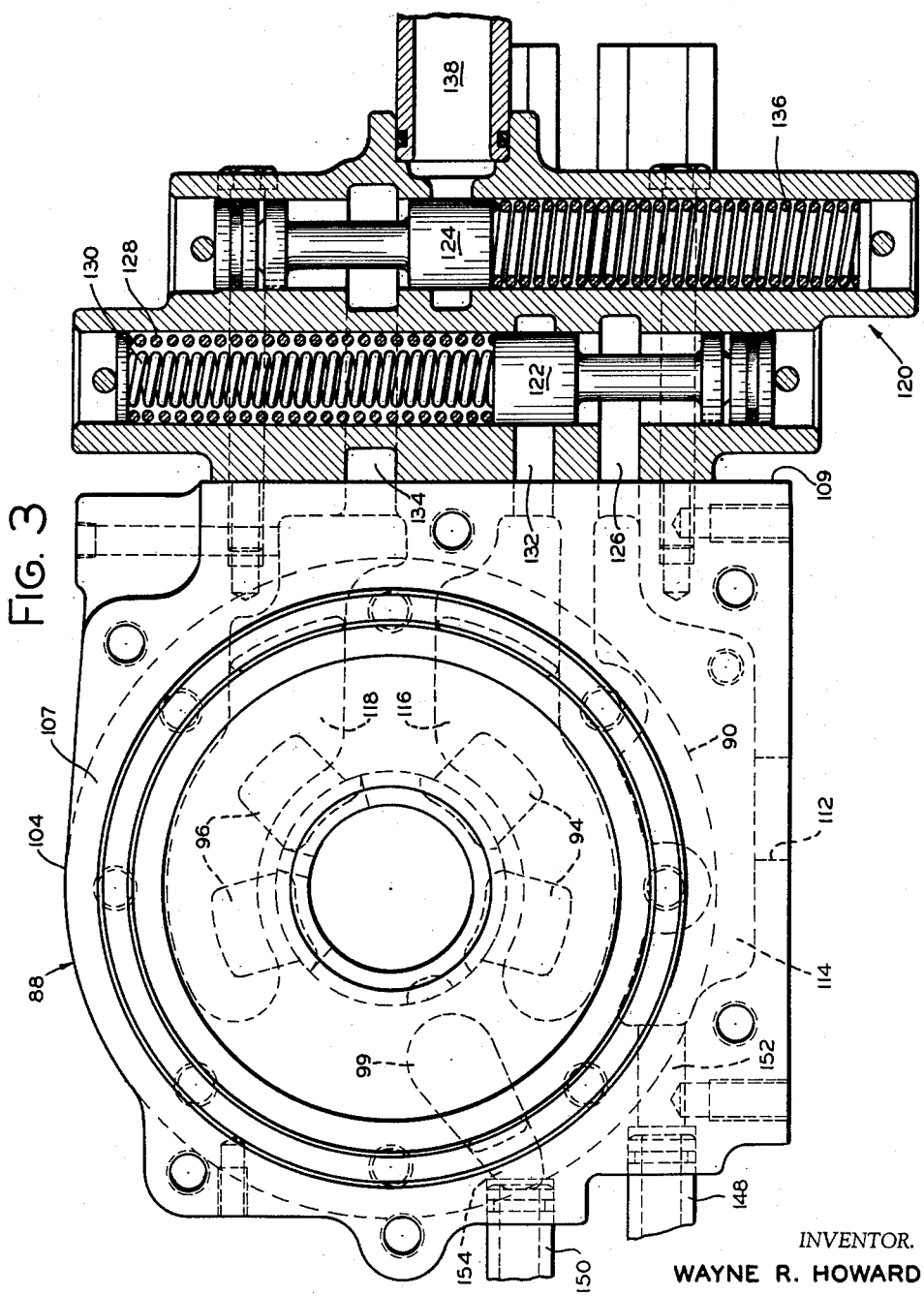
FIGURE 3 is a rear elevational view of the distributor block assembly on an enlarged scale also viewed substantially along the line 2—2 of FIGURE 1 and showing more clearly the structure and arrangement of the pressure regulating valves.

High pressure fluid for the operation of clutch 26 is also directed through a passage 98 in the reactor sleeve 68 and through a suitable passage formed in the internal sleeve 93 to the interior of the driven shaft 24 by way of suitably formed passages 100 and 102 therein. The passage 98 actually would not show in FIGURE 1 as the section is taken, but is shown circumferentially out of position for purposes of clarity in the illustration and in order to simplify the drawing. Referring to FIGURES 2, 3 and 7, the passage 98 actually is in circumferential registry with a corresponding aperture 99 in the distributor block 88.

The distributor block 88 comprises a main body portion 104 which is secured at one face 105 thereof as mentioned hereinbefore, to the flange 90 of the reactor sleeve 68 and is secured at its opposite face 107 to a wall 106 of the converter housing. The pump 80 is mounted to the bottom of the distributor block 88 by means of suitable machine screws 108 or the like. The high pressure outlet 110 (see FIGURE 2) of the pump 80 communicates by way of a passage 112 with the interior of the body 104 of the distributor block 88. The body 104 of the distributor block 88 is formed with three separate cored chambers 114, 116 and 118. The chamber 114 comprises a high pressure chamber which communicates with the pump outlet 110 by way of the passage 112. The chambers 116 and 118 comprise low pressure chambers which communicate, respectively, with the inlet passages 94 and outlet passages 96 from the torque converter 21.

Mounted on one side face 109 of the body 104 of the distributor block 88 is a pressure regulating valve block 120 (see FIGURE 3) which contains a high pressure regulating valve 122 and a low pressure regulating valve 124 both of which are of conventional type.

The high pressure regulating valve 122 communicates by means of a passage 126 with the high pressure chamber 114 and is biased to the position shown by means of a pair of concentrically arranged compression springs 128 and 130 to maintain a predetermined pressure, for example, of the order of 150–200 pounds per square inch in the chamber 114. When the pressure in the chamber 114 exceeds the predetermined amount, the valve 122 is urged upwardly against the bias of the springs 128 and 130 to thereby establish a communication by way of a passage 132 with the chamber 116 in the distributor block which communicates with the inlet passages 94 to the torque converter 21. The high pressure chamber supplies fluid for operation of the hydraulic clutch 26 as will be described presently and thus, by virtue of the above mentioned arrangement of the pressure regulating valve 122, the presence of sufficient pressure for the operation of the clutch is assured before any fluid can be admitted for circulation through the torque converter 21.

The chamber 118 commuicates by way of a passage 134 with the low pressure regulating valve 124 which valve is biased to the position shown by means of a compression spring 136 to maintain a predetermined pressure, for example, of the order of 30–40 pounds per square inch in the chamber 118 and thus in the converter chamber 38. When the pressure in the chamber 118 exceeds the predetermined amount, the valve 124 is urged downwardly against the bias of the spring 136 to thereby establish a communication between the chamber 118 and a conduit 138 when it is directed by conventional tubing 139 to a cooler 140, see FIGURE 2, for cooling and subsequent delivery to the sump 82 for recirculation by the pump 80.

Mounted exteriorly of the housing for the power transmission mechanism 20 is a control valve 142 (FIGURE 2) having a body portion 144 forming a cover plate for access to the housing. The control valve 142 is of the conventional sliding spool type having an operating rod 146 which may be manually operated to selectively cause fluid under pressure to be admitted to the clutch 26 for actuation thereof. Any suitable linkage may be secured to the operating rod 146 for remote control thereof or the operating rod may form the core of a solenoid for electrical operation thereof by a remotely located switch in a conventional manner.

As may be seen upon inspection of FIGURES 2 and 3, a pair of tubes or conduits 148 and 150 are secured to the distributor block 88 on a side face 111 thereof. The conduit 148 communicates at one end thereof with the high pressure chamber 114 in the distributor block 88 by means of a passage 152. The opposite end of the conduit 148 is connected to the control valve 142 and forms an inlet thereto. One end of conduit 150 is also connected to the control valve 142 and forms an outlet therefrom. The opposite end of conduit 150 communicates with a passage 154 in the distributor block 88 which in turn communicates with the aperture 99 in the face 105 of the distributor block which leads to passage 98 and to the clutch 26. The operation of the control valve 142 is such that in the lower position thereof the sliding spool blocks communication between the conduits 148 and 150 to prevent flow of fluid to the clutch 26 and the clutch thus is disengaged. Movement of the operating rod 146 to the upper position positions the sliding spool to establish communication between the conduits 148 and 150 and thus directs fluid from the high pressure chamber 114 to the clutch 26 through the passages just described.

For purposes of a better understanding of the structure and operation of the distributor block 88, let it be assumed that the prime mover which operates the flywheel 22 is not operating and that it is desired to operate the torque converter to drive a transmission connected thereto. The prime mover is first started in operation to rotate the impeller wheel 28 which drives the gear pump 80 through the gears 76 and 78 thereby transmitting fluid under pressure into the distributor block 88. When the pressure within the high pressure chamber 114 reaches a predetermined degree which is satisfactory for operation of the clutch 26, the clutch may be engaged by movement of the operating rod 146 of the clutch control valve 142 to establish communication between the conduits 148 and 150 whereby high pressure fluid is directed from the distributor block 88 to the clutch 26 by way of the passages in the reactor sleeve 68 and driven shaft 24 as previously described. The pressure in the high pressure chamber 114 will be maintained at all times by the high pressure regulating valve 122. The fluid not required for operation of the clutch by-passes the high pressure regulating valve 122 as above described and then flows into the chamber 116 by way of the passage 132, thence into the torque converter 21 by way of the inlet passages 94 for circulation through the converter in a conventional manner. When circulating fluid is discharged from the converter it is directed via the outlet passages 96 in the reactor sleeve 68 into the chamber 118 of the distributor block 88 and thence through the low pressure regulating valve 124 to the cooler 140 for subsequent recirculation by the pump 80. The pressure of the fluid within the converter chamber 38 is maintained at a predetermined amount at all times by the operation of the pressure regulating valve 124.

It will now be apparent to those skilled in the art that the present invention provides, as a unitary sub-structure for power transmission mechanisms, a new and novel fluid distributor block and associated structure. The distributor block contains the complicated fluid passages required to direct the flow of fluid under varying pressures to the necessary locations for satisfactory operation of the torque converter as well as to the hydraulic clutch associated with the torque converter. By virtue of the fact that the distributor block 88 is provided with a plurality of flat mounting surfaces such as the surfaces 105, 107, and 109, the assembly to the walls of the converter housing is facilitated, and complicated and expensive construction is eliminated. Also, because of the fact that the major portion of the fluid distributor and pressure regulating elements are located wholly within the torque converter housing, the problem of satisfactory sealing to prevent fluid leakage is minimized since any slight leakage at the various internal connections will merely return the fluid directly to the sump 82 for recirculation by the pump 80.

The arrangement of the invention as above described provides a convenient arrangement for servicing of the fluid control elements inasmuch as the pump 80, the distributor block 88, and the pressure regulating valve block 120 are all secured together as a unitary sub-assembly to which access may readily be had for removal as a unit for servicing or replacement, as necessary, merely by removing an access cover such as the cover 144 on which the clutch control valve 142 is located.

Furthermore, the construction as described hereinbefore provides a fluid distribution and control arrangement which is inexpensive to manufacture, and which is of relatively simple and rugged construction as opposed to prior art arrangements, whereby it requires a minimum of service and maintenance.

It is to be understood that the foregoing description is merely illustrative of a preferred embodiment of the invention and that the scope of the invention is not to be limited thereto but is to be determined by the appended claims.

I claim:

1. In a power transmission including a hydrodynamic torque converter and fluid pressure operated clutch means for connecting said torque converter to means to be driven thereby, the combination including a housing for the power transmission, a fluid distributor block mounted wholly within said housing, said fluid distributor block having one high and two low pressure fluid passages therein, a source of fluid under pressure communicating with the high pressure fluid passage in said distributor block, control valve means operatively associated with said distributor block and selectively actuatable to direct fluid from said high pressure fluid passage to the fluid pressure operated clutch means, first pressure regulating valve means associated with said fluid distributor block and communicating with said high and one said low pressure fluid passages therein, said valve means being adapted and arranged to maintain a predetermined fluid pressure within said high pressure passage and to by-pass excess fluid into said one low pressure passage, inlet and outlet passages for said torque converter, said low pressure passages in said distributor block communicating with the inlet and outlet passages to said converter, and a second pressure regulating valve means associated with said distributor block and communicating with said second low pressure fluid passage and adapted and arranged to maintain a predetermined fluid pressure within said torque converter.

2. In a power transmission, the combination of a hydrodynamic torque converter, a fluid pressure actuated clutch, said clutch being engageable for connecting said torque converter to a load, a source of fluid under pressure, said torque converter having fluid inlet and outlet passages communicating therewith, a housing for the said torque converter, a fluid distributor block disposed wholly within said housing, a first hydraulic system including said source of fluid under pressure, said distributor block and said inlet and outlet passages to said converter, a first pressure regulating valve associated with said distributor block for maintaining a predetermined fluid pressure in said first hydraulic system, a second hydraulic system including said source of fluid under pressure, said distributor block, and said fluid actuated clutch, a control valve for selectively admitting fluid under pressure in said second system to said fluid actuated clutch, and a second pressure regulating valve associated with said distributor block for maintaining a predetermined fluid pressure in said second hydraulic system, said second pressure regulating valve being adapted and arranged to by-pass excess fluid from said second system to said first system through said distributor block.

3. In a fluid distributor system for a power transmission mechanism including a torque converter and a fluid actuated clutch selectively operable for connecting the torque converter to a load and disconnecting it from a load, a housing for the torque converter, said housing having an end wall and an interior dividing wall, means associated with said dividing wall and extending therethrough and containing inlet and outlet passages for establishing a fluid circulating path through said torque converter, said fluid actuated clutch being located exteriorly of said end wall, a unitary fluid distributing assembly mounted wholly within said housing in the space between said dividing wall and said end wall, said distributor assembly including a pump for transmitting fluid under pressure to said torque converter and said fluid actuated clutch, a distributor block containing high and low pressure passages for the fluid under pressure, and first and second pressure regulating valve means for maintaining, respectively, the pressure in said high and low pressure passages, control valve means for selectively directing fluid from said source of fluid under pressure through said high pressure passage to said fluid actuated clutch, said first pressure regulating valve means being adapted and arranged to assure a predetermined pressure of operating fluid for said clutch and by-passing excess fluid from said high pressure passage to said low pressure passages, said low pressure passages being in communication with said inlet and outlet passages to said torque converter, and said second pressure regulating valve means being adapted and arranged to maintain a predetermined pressure of operating fluid in said torque converter.

4. In a power transmission having a hydrodynamic torque converter and a fluid pressure actuated clutch for connecting the torque converter to a load, fluid distributing means for directing fluid under a predetermined high pressure for operating the fluid actuated clutch and for directing fluid at a predetermined low pressure into and out of the torque converter through inlet and outlet passages therein, a housing for the power transmission, the fluid distributing means being located wholly within said housing and comprising in combination; a pump for transmitting fluid under pressure, a fluid distributor block having an inlet passage connected to the delivery side of said pump, a high pressure passage communicating with said inlet passage in said distributing block and with said fluid actuated clutch, a first low pressure passage in said distributing block communicating with the inlet to the torque converter, a second low pressure passage in said distributing block communicating with the outlet passage from the torque converter, a high pressure regulating valve communicating with said high pressure passage and with said first low pressure passage adapted and arranged to maintain a predetermined fluid pressure in said high pressure passage for operation of said clutch and to by-pass excess fluid into said first low pressure passage for circulation through said torque converter, and a low pressure regulating valve communicating with said second low pressure passage for maintaining a predetermined fluid pressure within said torque converter.

5. The combination as specified in claim 4, wherein said pump, said distributor block, and both said high and low pressure regulating valves are connected together as a unitary structure.

6. In a power transmission having a hydrodynamic torque converter and a fluid pressure actuated clutch for connecting the torque converter to a load, a housing containing the torque converter and fluid inlet and outlet openings for circulation of fluid therethrough, a rotatable shaft driven by the torque converter, a fluid conducting passage in said shaft communicating with the clutch, a source of fluid under pressure, and unitary fluid distributor means located entirely within said housing and communicating with said source of fluid under pressure, said fluid distributor means having a first high pressure passage communicating with said source of fluid under pressure, and a second high pressure passage communicating with said fluid conducting passage to said clutch, a clutch control valve located exteriorly of said housing, conduit means connecting said first and second high pressure passages to said control valve, said control valve being selectively operable to provide communication between said first and second high pressure passages to thereby conduct fluid under pressure to the clutch to engage same, said fluid distributor means also having a first low pressure passage communicating with the fluid inlet opening to the converter and a second low pressure passage communicating with the fluid outlet opening from the converter to thereby conduct fluid under pressure through said torque converter.

7. The combination as specified in claim 6, wherein said source of fluid under pressure comprises a positive displacement pump located within said housing and attached to said fluid distributor means.

8. The combination as specified in claim 6, including first pressure regulating valve means associated with said distributor means and adapted and arranged to maintain a predetermined pressure in said high pressure passages for operation of the clutch and to by-pass excess fluid to the said first low pressure passage, and second pressure regulating valve means associated with said distributor means and adapted and arranged to maintain a predetermined fluid pressure in the torque converter.

9. The combination as specified in claim 8, wherein said source of fluid under pressure, said distributor means, and both said first and second pressure regulating valve means are connected together for assembly in said housing as a unitary structure.

10. In a power transmission having a hydrodynamic torque converter and a fluid pressure actuated clutch for connecting the torque converter to a load, a housing for containing the rotatable elements of said torque converter, the torque converter having fluid inlet and outlet openings for circulation of fluid therethrough, a rotatable shaft driven by the torque converter, a fluid conducting passage in said shaft communicating with the clutch, a source of fluid under pressure, and unitary fluid distributor means located entirely within said housing and communicating with said source of fluid under pressure, said fluid distributor means including a plurality of high and low pressure passages for conducting fluid under pressure to the clutch and to the torque converter, first pressure regulating valve means associated with said distributor means and communicating with a high pressure passage for maintaining a predetermined pressure therein for operation of the clutch, and second pressure regulating valve means associated with said distributor means and communicating with a low pressure passage for maintaining a predetermined pressure of operating fluid circulating through the torque converter.

11. The combination as specified in claim 10, wherein said first pressure regulating valve means also communicates with a low pressure passage and is adapted to by-pass fluid not required by the clutch into such passage.

(References on following page)

References Cited in the file of this patent

UNITED STATES PATENTS

| | | |
|---|---|---|
| 2,516,208 | Hasbany | July 25, 1950 |
| 2,597,921 | Churchill et al. | May 27, 1952 |
| 2,641,342 | Hasbrouck | June 9, 1953 |
| 2,642,168 | Black et al. | June 16, 1953 |
| 2,707,408 | Ahlen | May 3, 1955 |
| 2,713,273 | Ebsworth | July 19, 1955 |
| 2,726,557 | Ackerman | Dec. 13, 1955 |
| 2,757,552 | English | Aug. 7, 1956 |
| 2,789,448 | Lapsley | Apr. 23, 1957 |
| 2,793,726 | Jandasek | May 28, 1957 |
| 2,833,159 | Alexandrescu | May 6, 1958 |
| 2,844,049 | Lapsley et al. | July 22, 1958 |
| 2,866,361 | Gatiss | Dec. 30, 1958 |
| 2,867,136 | Albinson et al. | Jan. 6, 1959 |
| 2,950,630 | Zeidler | Aug. 30, 1960 |
| 2,969,131 | Black et al. | Jan. 24, 1961 |